United States Patent [19]

Haisma et al.

[11] Patent Number: 4,617,206

[45] Date of Patent: Oct. 14, 1986

[54] METHOD OF MANUFACTURING A LAYER OF AN OXIDE OF AN ELEMENT FROM GROUP IVA

[75] Inventors: Jan Haisma; Petrus Heller; Johannes M. M. Pasmans; Udo K. P. Biermann, all of Eindhoven, Netherlands

[73] Assignee: U.S. Philips Corporation, New York, N.Y.

[21] Appl. No.: 645,884

[22] Filed: Aug. 30, 1984

[30] Foreign Application Priority Data

Sep. 2, 1983 [NL] Netherlands .......................... 8303059

[51] Int. Cl.$^4$ .............................................. B05D 3/02
[52] U.S. Cl. ................................ 427/374.1; 427/53.1; 427/74; 427/108; 427/126.3; 427/165; 427/226
[58] Field of Search ............ 427/108, 165, 226, 126.3, 427/374.1, 53.1, 74

[56] References Cited

U.S. PATENT DOCUMENTS

| | | | |
|---|---|---|---|
| 3,916,041 | 10/1975 | Chu | 427/126.3 |
| 4,129,434 | 12/1978 | Plumat | 427/165 |
| 4,232,062 | 11/1980 | Okino | 427/226 |
| 4,252,841 | 2/1981 | Kinugawa | 427/108 |
| 4,492,721 | 1/1985 | Joosten | 427/165 |

OTHER PUBLICATIONS

Kern et al., "Titanium Dioxide Antireflection Coating for Silicon Solar Cells by Spray Deposition" RCA Review, vol. 41, Jun. 1980, pp. 133–179.

*Primary Examiner*—John D. Smith
*Attorney, Agent, or Firm*—Norman N. Spain

[57] ABSTRACT

Providing a transparent layer of an oxide of an element from group IVa of the Periodic Table, notably $TiO_2$, by providing a substrate with a solution of a compound of the element which upon heating is converted into the relevant oxide, drying the film and heating the dried film so as to form the transparent layer of the oxide. The oxide thus obtained is a form having a comparatively low refractive index. By heating the product, after providing the film, rapidly to a temperature of above 700° C., preferably above 1,000° C., keeping it at this temperature for some time and then rapidly cooling it again, a modification having a higher refractive index (for example, for $TiO_2$ rutile) is obtained.

2 Claims, No Drawings

METHOD OF MANUFACTURING A LAYER OF AN OXIDE OF AN ELEMENT FROM GROUP IVA

The invention relates to a method of manufacturing a member consisting of a substrate bearing a transparent layer of an oxide of an element from group IVa of the Periodic Table and to the products obtained by means of the method.

The oxides of said elements, $TiO_2$, $ZrO_2$ and $HfO_2$, are frequently used to form layers having an optical effect. Various methods of providing such layers are being used. The vapour deposition process is much used but methods in which no vacuum need be used are to be preferred for industrial manufacture on a large scale. In such a method a substrate is dipped in a solution of a compound of the element in question which upon heating is converted into the relevant oxide in the form of a layer, or this solution is spun on a substrate. Very suitable solutions are metallo-organic compounds of the element, for example, Ti-dipropoxy-acetylacetonate, in an organic solvent. After providing a film of such a solution on the substrate, this is heated in order to evaporate the solvent and a thermal after-treatment then takes place in which the residue consisting of carbon and carbon-containing compounds disappears and the desired layer remains in the pure state.

These methods which start from solutions provide good layers of $TiO_2$. The refractive index thereof as a rule is not higher than 2.0, while according to its physical possibility a higher value would have to be obtained. Vapour-deposited layers have refractive index values between 2.3 and 2.6. A corresponding situation applies to both $ZrO_2$ and $HfO_2$.

Various modifications of titanium dioxide exist with different physical properties, notably different values of the refractive index. In addition to the amorphous state, a tetragonal anatase form, a tetragonal rutile form and an orthorhombic brookite form exist.

From an article by W. Kern et al in RCA Review 41, 133-180 (1980), in particular pages 153-162, it is known that by a thermal aftertreatment of a substrate with a $TiO_2$ layer obtained by spraying at a temperature of 450° C., an increase of the refractive index is increased to a value of from approximately 2.1 to 2.2. The authors of said article state that heating of the substrate with the layer to higher temperatures has hardly any effect on the properties of the layer in that an undesired crystalline phase, anatase, is formed with inter alia a higher optical absorption.

The invention, however, enables the refractive index of titanium dioxide layers to be increased to a value $n_D$ of 2.6.

A comparable situation exists for both zirconium oxide and hafnium oxide.

The method according to the invention in which the substrate is provided with a film of a solution of a compound of the element which upon heating is converted into the relevant oxide, drying the film and heating the dried film so as to form the transparent layer of the oxide, is characterized in that the substrate bearing the dried film is heated to a temperature above 700° C. at a rate of at least 30° C./sec. in the range between 300° C. and the temperature above 700° C., is kept at the temperature above 700° C. for at least 45 seconds, and is cooled to room temperature, at a rate of at least 30° C./sec. at least in the range between the temperature above 700° C. and 300° C. In the experiments which have led to the invention it was found that when the temperature range between 300° and 700° C. is rapidly traversed in this manner, the formation of the anatase modification is prevented and the rutile modification is obtained of which it is known that in the intrinsically polycrystalline state it has an effective refractive index of 2.6.

Various methods are known in which said rapid heating can be realized. Placing the member directly in a furnace having a temperature above 700° C. already gives a visible reflection increase after approximately 30 seconds. Indirect heating via a quartz body in a hydrogen flame also provides the desired result. Finally, by means of a laser beam (for example a $CO_2$ laser) it is possible not only to produce the conversion homogeneously but also in a structured manner.

As a result of the rapid heating to a temperature above 700° C. an increase of the refractive index is achieved already at 750° C. However, the optimum effect is obtained when, after providing the layer, the member is heated to a temperature above 1,000° C. at a rate of at least 30° C./sec., at least in the range between 300° C. and the temperature above 1000° C., is kept at the temperature above 1000° C. for at least 45 seconds and is then cooled to room temperature, also at a rate of at least 30° C. per second at least in the range between the temperature above 1000° C. and 300° C.

A practical example of the method according to the invention will now be described in detail.

A solution of titanium acetyl acetonate in isopropanol is provided on a glass substrate (borosilicate glass or, for applications at high temperature: quartz glass), by means of spinning and/or dipping.

In the spinning process, a quantity of the said solution is provided on the substrate by means of a pipette and is uniformly distributed on the substrate by means of centrifugal force. The circumferential speed and the viscosity are decisive of the layer thickness which is obtained. In the dipping process the glass substrate is dipped in the solution and drawn out of it. The drawing rate and the viscosity of the liquid determine the layer thickness. The coated glass substrates are then dried at 80° C. for 20 minutes as a result of which the solvent disappears. Immediately thereafter the substrates are heated in a furnace at a temperature above 700° C. for 45 seconds. The substrate has to be heated rapidly (30° C./sec from 300° C.). The provided layers may also be irradiated by means of a 80 Watt $CO_2$ laser, as a result of which the layers reach a high local temperature in a very short period of time (the movement under the laser beam is 20 mm/sec.). The substrate bearing the applied layer is subsequently cooled at a rate of at least 30° C./sec. As a result of the said high temperature treatment the following results are achieved:

| | | |
|---|---|---|
| 750° C. | effective refractive index $(n_D)TiO_2$ | 2.10 |
| 900°.C. | effective refractive index $(n_D)TiO_2$ | 2.40 |
| 1,050° C. | effective refractive index $(n_D)TiO_2$ | 2.50–2.60 |
| irradiation by means of a laser | effective refractive index $(n_D)TiO_2$ | 2.60 |

What is claimed is:
1. A method of manufacturing a member consisting of a substrate bearing a transparent layer of an oxide of an element from group IVa of the Periodic Table by providing the substrate with a film of a solution of a compound of the element which upon heating is converted into the relevant oxide, drying the film and heating the dried film so as to form the transparent layer of the oxide, wherein the substrate bearing the dried film is heated to a temperature above 700° C. at a rate of at least 30° C./sec in the range between 300° C. and the temperature above 700° C., is kept at the temperature above 700° C. for at least 45 seconds and is cooled to room temperature at a rate of at least 30° C./sec, at least in the range of the temperature above 700° C. and 300° C.

2. A method as claimed in claim 1, characterized in that after providing the dried film the member is heated to a temperature above 1,000° C. at a rate of at least 30° C./sec at least in the range between 300° C. and the temperature above 1000° C., is kept at the temperature above 1000° C. for at least 45 seconds and is then cooled to room temperature also at a rate of at least 30° C./sec. at least in the range between the temperature above 1000° C. and 300° C.

* * * * *